United States Patent
Suzuki (10) Patent No.: US 7,334,751 B2
(45) Date of Patent: Feb. 26, 2008

(54) TAPE REEL, CARTRIDGE CASE, AND INFORMATION RECORDING MEDIUM

(75) Inventor: Hiroki Suzuki, Tokyo (JP)

(73) Assignee: TDK Corporation, Tokyo (JP)

(*) Notice: Subject to any disclaimer, the term of this patent is extended or adjusted under 35 U.S.C. 154(b) by 81 days.

(21) Appl. No.: 11/362,258

(22) Filed: Feb. 27, 2006

(65) Prior Publication Data

US 2007/0200020 A1    Aug. 30, 2007

(51) Int. Cl.
 *G11B 23/04* (2006.01)
(52) U.S. Cl. .................. 242/340; 242/611
(58) Field of Classification Search .......... 242/340, 242/342, 348, 348.2, 611, 611.1; 360/85, 360/93, 132

See application file for complete search history.

(56) References Cited

U.S. PATENT DOCUMENTS

| | | | |
|---|---|---|---|
| 6,491,247 B2 * | 12/2002 | Huettenegger | 242/342 |
| 6,651,917 B2 | 11/2003 | Momoi et al. | |
| 6,676,055 B1 * | 1/2004 | Martin | 242/340 |
| 6,869,037 B2 * | 3/2005 | Hiraguchi | 242/348 |
| 7,032,853 B2 * | 4/2006 | Hiraguchi | 242/340 |
| 2002/0047063 A1 | 4/2002 | Kaneda et al. | |
| 2004/0089755 A1 * | 5/2004 | Evanoff et al. | 242/340 |
| 2004/0163099 A1 | 8/2004 | Hashizume et al. | |
| 2005/0263638 A1 | 12/2005 | Sasaki et al. | |
| 2005/0274839 A1 | 12/2005 | Sasaki et al. | |

FOREIGN PATENT DOCUMENTS

| | | |
|---|---|---|
| JP | 2003-022645 | 1/2003 |
| JP | 2005-209277 | 8/2005 |

OTHER PUBLICATIONS

English Language Abstract of JP 2003-022645.
English Language Abstract of JP 2005-209277.
U.S. Appl. No. 11/042,174, to Takateru Satoh, filed on Jan. 26, 2005.
U.S. Appl. No. 11/090,018, to Hiroki Suzuki, filed on Mar. 28, 2005.

* cited by examiner

*Primary Examiner*—William A Rivera
(74) *Attorney, Agent, or Firm*—Greenblum & Bernstein, P.L.C.

(57) ABSTRACT

A tape reel includes a bottomed cylinder-shaped hub, on an outer surface of a base plate of which driven teeth capable of meshing with driving teeth are disposed. Contact surfaces capable of being contacted by front end surfaces of the driving teeth in a state where the driving teeth and the driven teeth mesh are formed on the outer surface of the base plate.

6 Claims, 6 Drawing Sheets

TAPE REEL, CARTRIDGE CASE, AND INFORMATION RECORDING MEDIUM

BACKGROUND OF THE INVENTION

1. Field of the Invention

The present invention relates to a tape reel equipped with a hub having driven teeth capable of meshing with driving teeth, a cartridge case equipped with such tape reel, and an information recording medium equipped with such cartridge case.

2. Description of the Related Art

As one example of this type of information recording medium, a single-reel-type tape cartridge used for backing up data and the like is known. With this type of tape cartridge, driven teeth that are ring-shaped are disposed on the base plate of the hub of a tape reel, with driving teeth of a drive apparatus meshing with the driven teeth so that the tape reel can be rotated (driven) by the drive apparatus. Here, to cause the tape reel to rotate smoothly, the tape reel should preferably be fabricated so that every tooth surface of the teeth that compose the driven teeth contacts every tooth surface of the teeth that compose the driving teeth. However, since the shape of the driven teeth is complex, when the tape reel is fabricated by injection molding, due to the characteristics of injection molding, extremely slight differences in the dimensions of the individual teeth composing the driven teeth are caused by slight changes in the molding conditions and the like. This means that it is extremely difficult to fabricate the tape reel so that all of the tooth surfaces are in contact. Accordingly, with such tape cartridge, when the driven teeth of the tape reel and the driving teeth of the drive apparatus mesh, the driven teeth and the driving teeth are in contact at certain positions and apart at other positions, resulting in the risk of surging occurring when the tape reel is rotated.

As a technique for solving the above problem, the tape cartridge disclosed in Japanese Laid-Open Patent Publication No. 2005-209277 is known. With this tape cartridge, gear teeth (driven teeth) in the shape of a ring that are formed on a lower surface of a base plate of the tape reel are composed of first gear teeth and second gear teeth with respectively different heights. The second gear teeth are formed with greater teeth heights than the first gear teeth, and as shown in FIG. 6 of the publication, two second gear teeth are disposed in each of three regions produced by dividing a circle. As a result, when the gear teeth and the driving teeth of a drive apparatus (tape drive) mesh, only the second gear teeth with the greater heights engage the driving teeth. Accordingly, with this tape cartridge, by precisely setting the dimensions of the low number of second gear teeth, it is possible to prevent surging from occurring when the tape reel rotates.

By investigating the tape cartridge described above, the present inventor discovered the following problem. With the above tape cartridge, by limiting the gear teeth of the tape reel that engage the driving teeth of the drive apparatus to the low number of second gear teeth and precisely setting the dimensions of the second gear teeth, surging of the tape reel can be prevented more reliably. However, as long as the tape reel is fabricated by injection molding, it is still extremely difficult to fabricate the tape reel so that the second gear teeth that are complex in form have the set dimensions. Accordingly, with this tape cartridge also, there is the problem that surging may occur when the tape reel rotates.

SUMMARY OF THE INVENTION

The present invention was conceived in view of the problem described above and it is a principal object of the present invention to provide a tape reel, a cartridge case, and an information recording medium that can prevent surging during rotation.

To achieve the stated object, a tape reel according to the present invention includes a bottomed cylinder-shaped hub, on an outer surface of a base plate of which driven teeth capable of meshing with driving teeth are disposed, wherein a contact surface capable of being contacted by front end surfaces of the driving teeth in a state where the driving teeth and the driven teeth mesh is formed on the outer surface of the base plate.

A cartridge case according to the present invention includes a tape reel having a bottomed cylinder-shaped hub, on an outer surface of a base plate of which driven teeth capable of meshing with driving teeth are disposed, and a case body that rotatably houses the tape reel, wherein a contact surface capable of being contacted by front end surfaces of the driving teeth in a state where the driving teeth and the driven teeth mesh is formed on the outer surface of the base plate.

An information recording medium according to the present invention includes: a cartridge case having a tape reel, which includes a bottomed cylinder-shaped hub, on an outer surface of a base plate of which driven teeth capable of meshing with driving teeth are disposed, and a case body that rotatably houses the tape reel; and a magnetic tape wound around the tape reel, wherein a contact surface capable of being contacted by front end surfaces of the driving teeth in a state where the driving teeth and the driven teeth mesh is formed on the outer surface of the base plate.

According to the above tape reel, cartridge case, and information recording medium, a contact surface capable of being contacted by front end surfaces of the driving teeth in a state where the driving teeth and the driven teeth mesh is formed on the outer surface of the base plate of the hub. This means that even if there is a difference between the actual dimensions of the driven teeth and the designed dimensions, a state where contacting parts and separated parts are produced when the driven teeth and the driving teeth mesh can be reliably avoided, and as a result, the driving teeth and the driven teeth can be caused to mesh in a state where front end surfaces of the driving teeth and the contact surface, that is, the driving teeth and the base plate of the hub, are parallel or substantially parallel. Accordingly, the tape reel can be smoothly rotated without surging, and therefore damage to the magnetic tape and the like can be reliably prevented.

Also, when the parallelism of the flanges of the tape reel is measured using a measuring jig, for example, front end surfaces of teeth of the measuring jig will contact the contact surface when the driven teeth and the teeth of the measuring jig mesh, and therefore even if there is a difference between the actual dimensions of the driven teeth and the designed dimensions, measurement can be carried out in a state where the reference plane of the driven teeth is parallel or substantially parallel to a measuring reference surface of the measuring jig. Accordingly, with the above tape reel, cartridge case, and information recording medium, the parallelism of the flanges can be correctly measured.

In this case, the driven teeth may be constructed so that in a state where the driving teeth and the driven teeth mesh, tooth surfaces of the driven teeth and driving teeth are apart from one another when the tape reel is not driven and the tooth surfaces contact one another when the tape reel is driven. With this construction, it is possible to reliably rotate the tape reel in a state where the front end surfaces of the driving teeth contact the contact surface.

Also, the contact surface may be formed at a position separated from a reference plane of the driven teeth toward the base plate by a length between a reference plane and the front end surfaces of the driving teeth. With the above construction, the driven teeth and the driving teeth can mesh in a state where front end surfaces of the driving teeth contact the contact surface and both reference planes coincide. Accordingly, it is possible to keep the clearance between the tooth surfaces of the driven teeth and the driving teeth uniform or substantially uniform in the non-driven state and to keep the contact between the tooth surfaces uniform or substantially uniform in the driven state, resulting in it being possible to reliably prevent rattling of the tape reel at the start of driving and at the end of driving.

In addition, the contact surface may be formed on each of three contact portions disposed on the outer surface of the base plate at equal intervals on a circle about a central axis of the hub. With this construction, since it is possible to support the tape reel with the front end surfaces of the driving teeth that contact the contact surfaces, the driving teeth and the base plate of the hub can be stably kept in a parallel or substantially parallel state.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a tape reel, a cartridge case, and an information recording medium according to the present invention will now be described with reference to the attached drawings.

First, the construction of an information recording medium 1 will be described with reference to the drawings.

Figure 1:
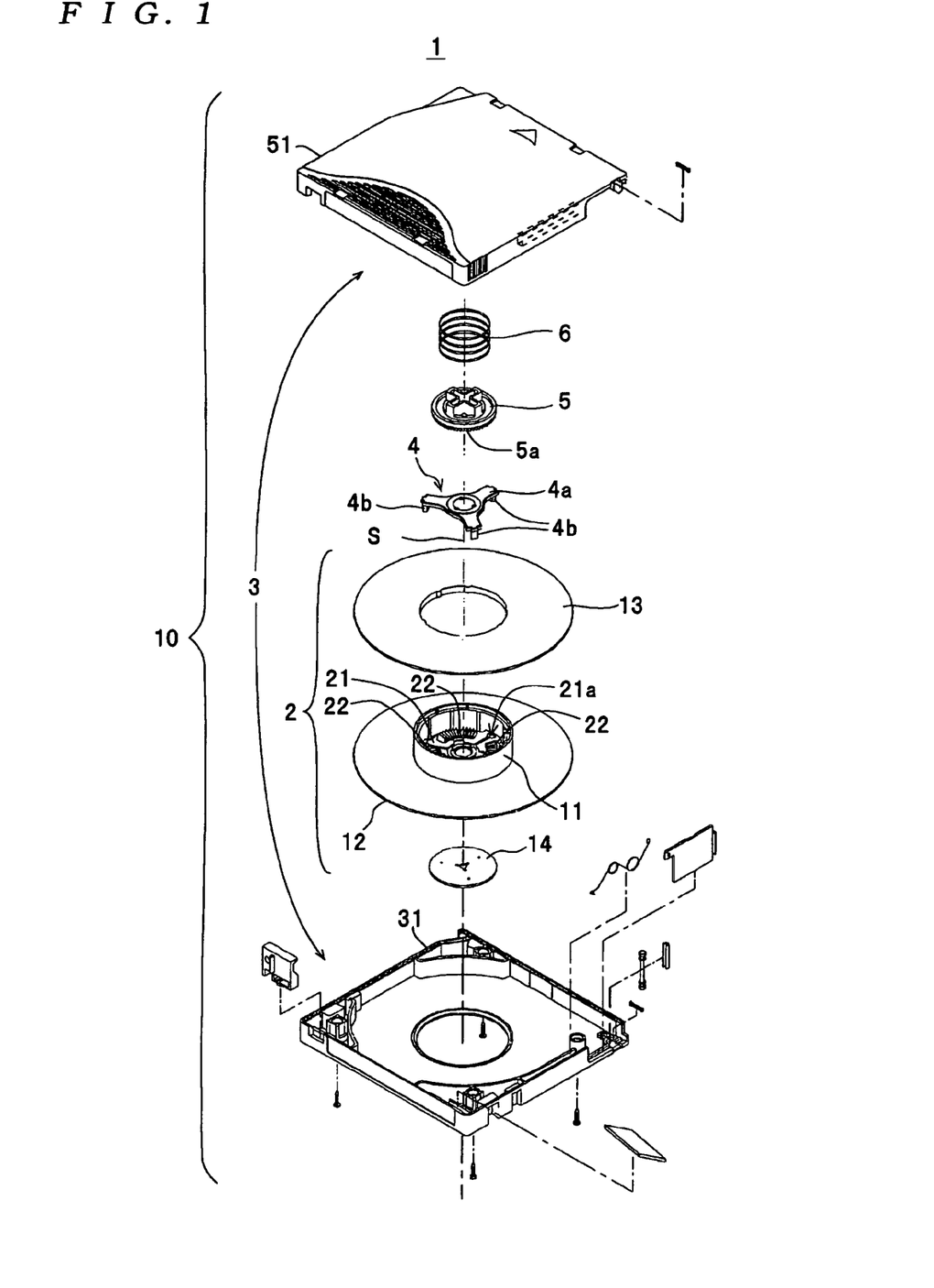
FIG. 1 is an exploded perspective view of an information recording medium.
Figure 2:
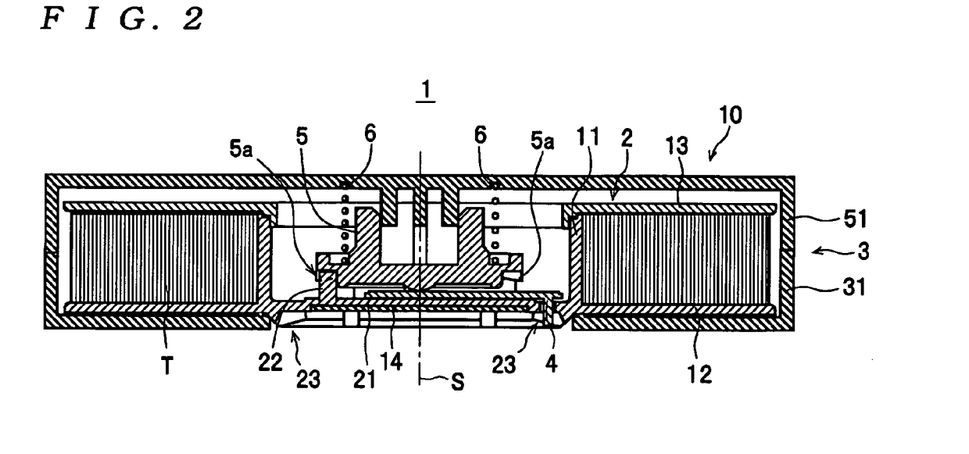
FIG. 2 is a cross-sectional view of the information recording medium.

The information recording medium 1 shown in FIGS. 1 and 2 is a single-reel type information recording medium used as a storage device for backing up data recorded by an electronic computer, for example, and as shown in the drawings includes a cartridge case 10 having: a tape reel 2, a case body 3, a brake releasing plate 4, a locking member 5, and a brake spring 6; and a magnetic tape T (see FIG. 2) wound around the tape reel 2. It should be noted that for ease of understanding the constructions of the various components, the magnetic tape T is omitted in FIG. 1 and in FIGS. 5 and 6 described later.

Figure 3:
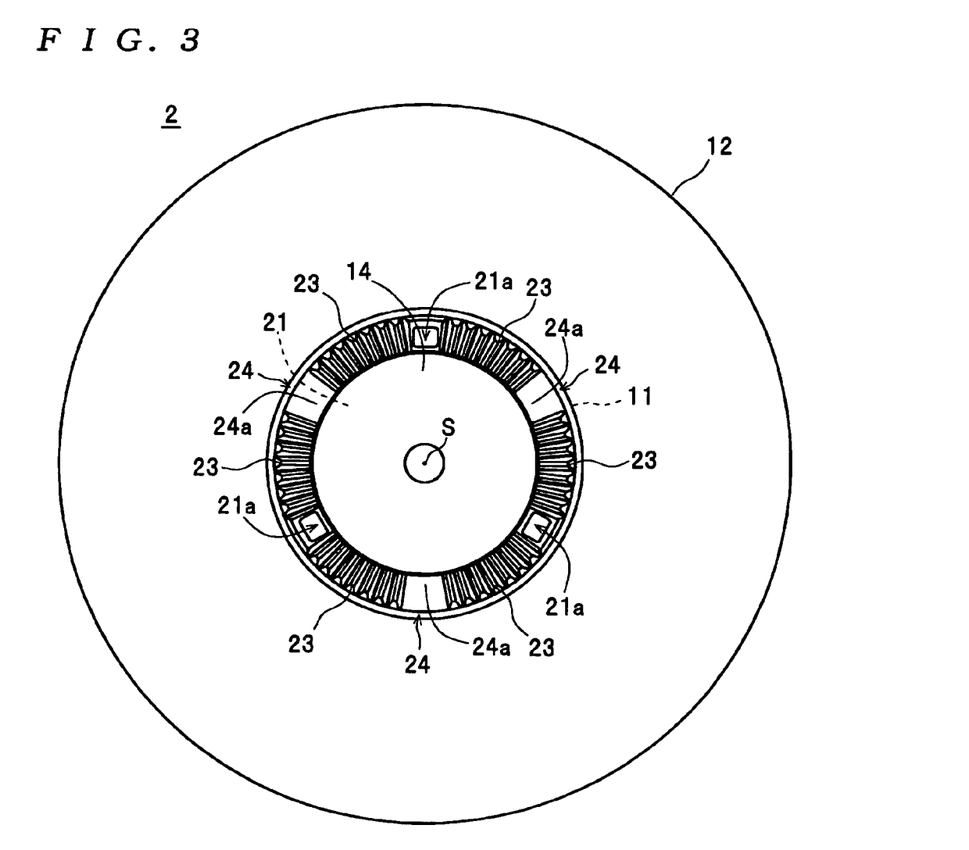
FIG. 3 is a plan view of a tape reel when looking from a lower flange side thereof.
Figure 4:
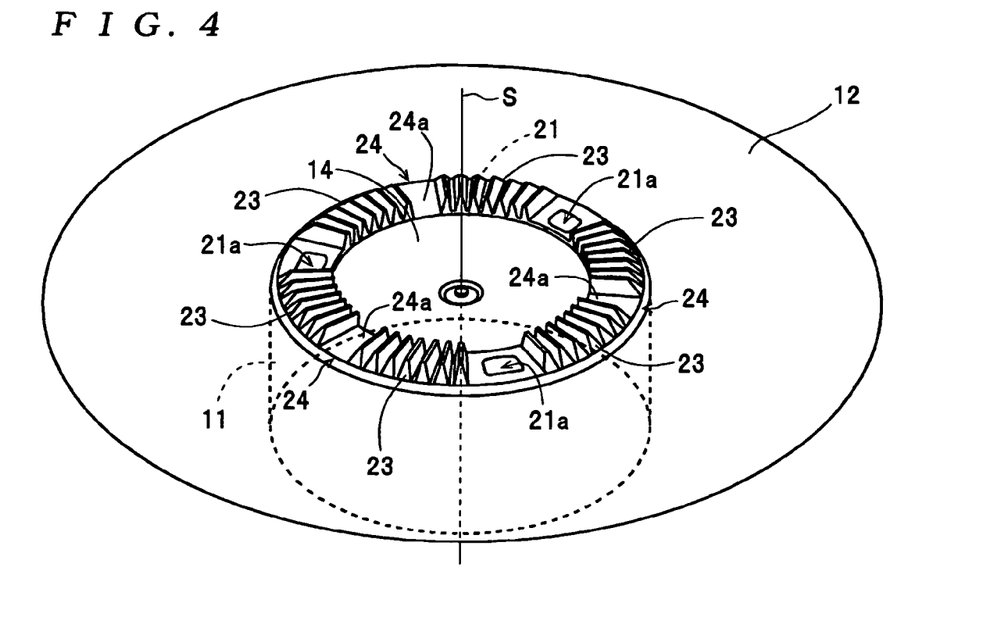
FIG. 4 is a perspective view of the tape reel and a chucking plate.

As shown in FIG. 1, the tape reel 2 includes a hub 11, a lower flange 12, an upper flange 13, and a chucking plate 14. The hub 11 is formed as a bottomed cylinder where an opening is formed at an upper end thereof, and is constructed so that the magnetic tape T can be wound therearound. As shown in FIGS. 1 and 2, three sets of brake teeth 22 that are arc-shaped when viewed from above and mesh with teeth 5a of the locking member 5 energized by the spring 6 are formed on the inner surface of the base plate 21 of the hub 11 so as to be positioned on a circle about an axis S (a "central axis" for the present invention) of the hub 11. As shown in FIGS. 3 and 4, six sets of driven teeth 23 that are arc-shaped when viewed from above and mesh with driving teeth 101 (see FIGS. 5 and 6) of a drive shaft 100 of a drive apparatus are formed on an outer surface of the base plate 21 so as to be positioned on a circle about the axis S. In addition, as shown in FIGS. 3 and 4, through-holes 21a for attaching the brake releasing plate 4 (see FIG. 1) so as to be capable of up-down movement are formed in the base plate 21 so as to be located in three out of the six intervals formed between adjacent sets of driven teeth 23. That is, the through-holes 21a are formed in every other interval out of the six intervals.

Figure 7:
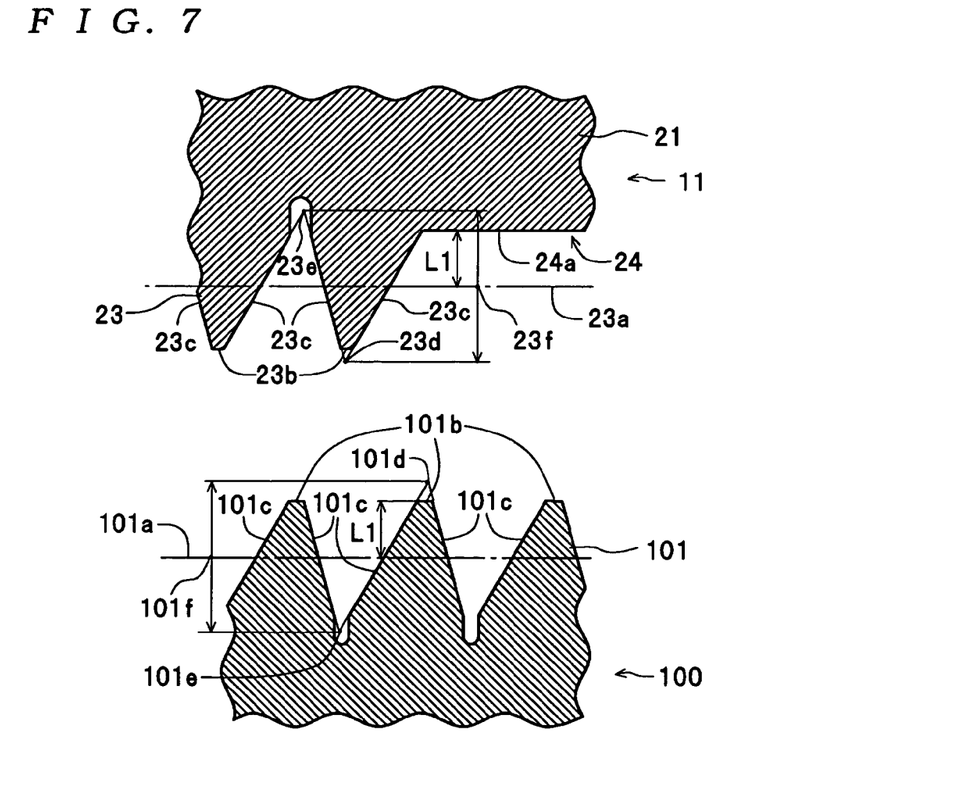
FIG. 7 is a cross-sectional view of principal parts of the driven teeth and principal parts of the driving teeth.
Figure 8:
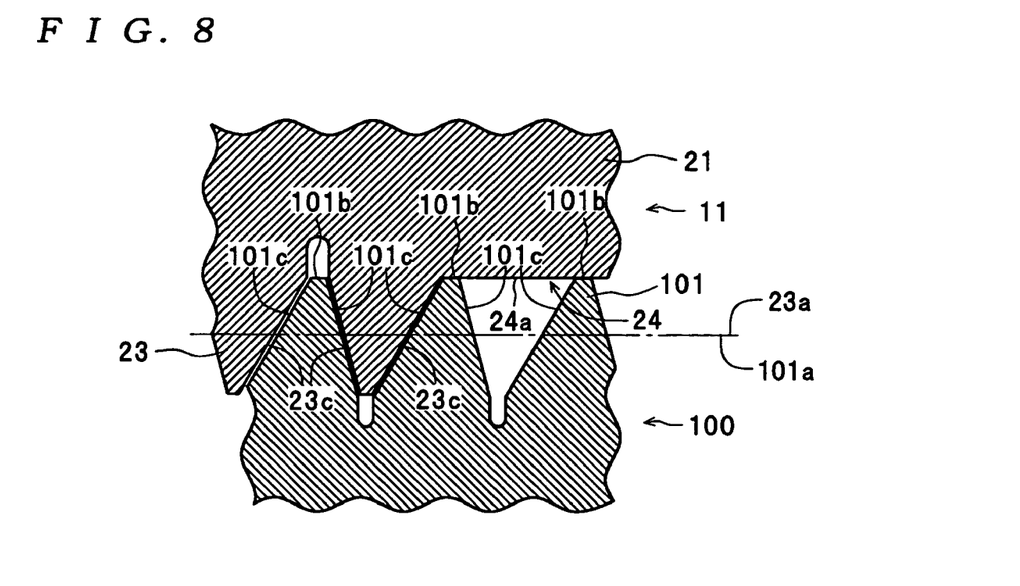
FIG. 8 is a cross-sectional view of the principal parts of the driven teeth and the principal parts of the driving teeth in a meshed state.

In addition, as shown in FIGS. 3 and 4, in the other three intervals in the outer surface of the base plate 21 aside from the three intervals in which the through-holes 21a are formed, three contact portions 24 with contact surfaces 24a are formed at equal intervals on a circle about the axis S. Here, as shown in FIG. 8, the contact surfaces 24a are surfaces for contacting front end surfaces 101b of the driving teeth 101 of the drive shaft 100 in a state where the driving teeth 101 mesh with the driven teeth 23. As shown in FIG. 7, the contact surfaces 24a are formed at positions separated from a reference plane 23a of the driven teeth 23 toward the base plate 21 by a length L1 between a reference plane 101a and the front end surfaces 101b of the driving teeth 101.

The reference plane 101a is a virtual plane used as a reference for designing and fabricating the driving teeth 101, and as shown in FIG. 7, is virtually defined by joining midpoints 101f in the teeth height direction between top intersections 101d and bottom intersections 101e produced when the tooth surfaces 101c composing the driving teeth 101 are virtually extended. Likewise, the reference plane 23a is a virtual plane used as a reference for designing and fabricating the driven teeth 23, and as shown in FIG. 7, is virtually defined by joining midpoints 23f in the teeth height direction between top intersections 23d and bottom intersections 23e produced when the tooth surfaces 23c composing the driven teeth 23 are virtually extended.

Figure 9:
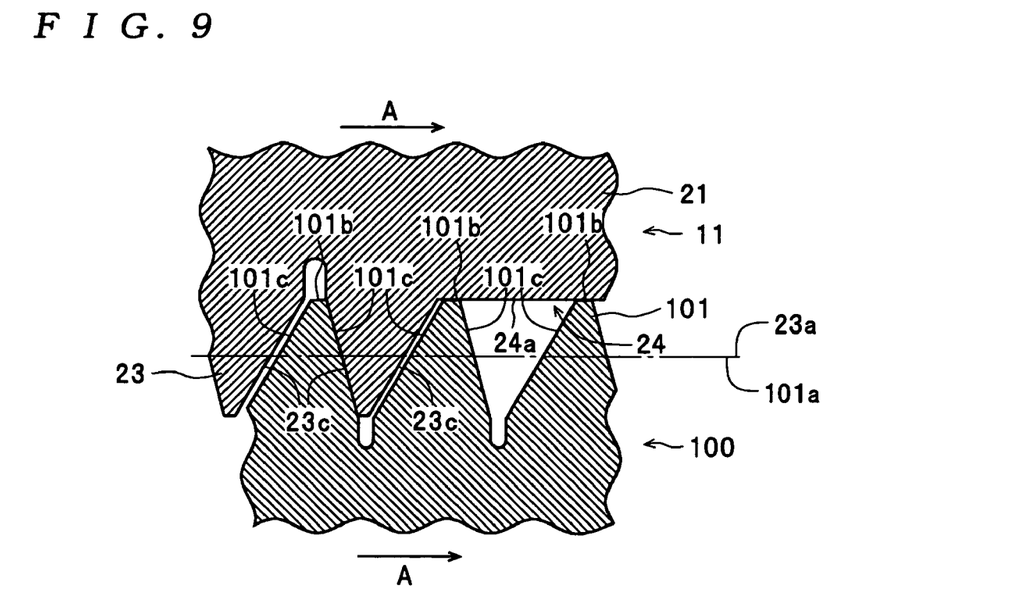
FIG. 9 is a cross-sectional view of the principal parts of the driven teeth and the principal parts of the driving teeth in a state where the drive apparatus is winding out a magnetic tape.
Figure 10:
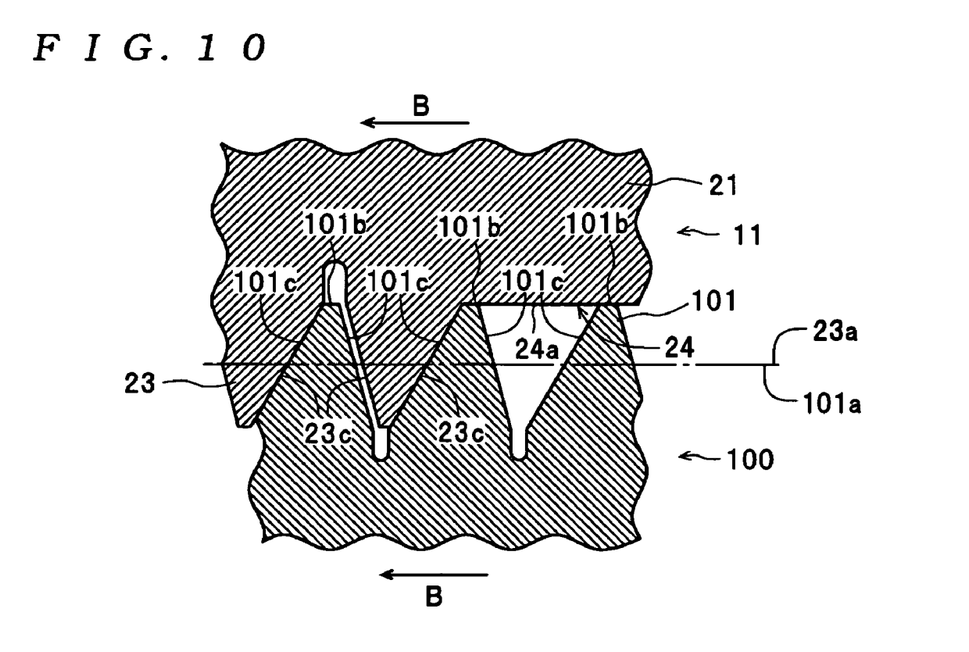
FIG. 10 is a cross-sectional view of the principal parts of the driven teeth and the principal parts of the driving teeth in a state where the magnetic tape is being rewound.

As shown in FIGS. 8 to 10, the driven teeth 23 are formed so that in a state where the teeth 23 and 101 mesh with the reference planes 23a and 101a coinciding, the tooth surfaces 23c become slightly distant from the tooth surfaces 101c of the driving teeth 101 in a stopped state (non-driven state) for the tape reel 2 and the tooth surfaces 23c and 101c contact each other in the rotating state (driven state) for the tape reel 2. That is, the driven teeth 23 are formed so that the individual teeth composing the driven teeth 23 are slightly smaller than the individual teeth constructing the driving teeth 101.

As shown in FIGS. 3 and 4, the lower flange 12 is disk-shaped and is integrally formed at a lower end (the end located at the top in FIG. 4) of the hub 11. As shown in FIG. 1, the upper flange 13 is also disk-shaped, and is fixed to the open end of the hub 11 by welding or the like. The chucking plate 14 is formed in a disk-like shape using a magnetic material such as iron or stainless steel and as shown in FIGS. 3 and 4, is disposed inside the driven teeth 23 on the base plate 21 of the hub 11. When the information recording medium 1 is set in a drive apparatus, the chucking plate 14 is pulled by magnetic attraction to a magnetic attraction portion of the drive shaft 100 of the drive apparatus and therefore functions so that the driving teeth 101 of the drive shaft 100 mesh with the driven teeth 23 formed on the base plate 21, thereby chucking the drive shaft 100 and the tape reel 2.

Here, during the manufacturing process of the information recording medium 1, when investigating whether the tape reel 2 is defective or non-defective, the parallelism of the reference plane 23a described above and the lower flange 12 and the parallelism of the reference plane 23a and the upper flange 13 are measured for example based on the distance from the reference plane 23a to the lower flange 12 and the distance from the reference plane 23a to the upper flange 13. Since the reference plane 23a is a virtual plane, it is difficult to measure the distances from the reference plane 23a to the lower flange 12 and to the upper flange 13. For this reason, when measuring the actual parallelism, a measuring jig with teeth of the same form as the driving teeth 101 is caused to mesh with the driven teeth 23 and the distances from a measuring reference surface, such as a base surface or a top surface of the measuring jig, to the lower flange 12 and the upper flange 13 are measured.

With a conventional tape reel, when there is a difference between the actual dimensions of the driven teeth 23 and the designed dimensions, even if such difference is only slight, when the driven teeth 23 and the teeth of the measuring jig mesh, the teeth will be in contact at certain positions and apart at other positions, resulting in the reference plane 23a becoming inclined to the measuring reference surface of the measuring jig. This means that with the conventional tape reel, the parallelism of the reference plane 23a and the lower flange 12 and the parallelism of the reference plane 23a and the upper flange 13 are greatly influenced by the molding precision of the driven teeth 23. On the other hand, with the tape reel 2, in a state where the driven teeth 23 mesh with the teeth of a measuring jig, the front end surfaces 101b contact the contact surfaces 24a and the tooth surfaces 23c are separated from the tooth surfaces 101c, and therefore even if there is a difference between the actual dimensions of the driven teeth 23 and the designed dimensions, so long as the reference plane 23a and the contact surfaces 24a are parallel or substantially parallel, the reference plane 23a will be parallel or substantially parallel to the measuring reference surface of the measuring jig, thereby solving the problem described above.

As shown in FIGS. 1 and 2, the case body 3 is constructed of a lower case 31 and an upper case 51 constructed so as to fit together and rotatably houses the tape reel 2 in an internal space formed when the lower and upper cases 31 and 51 are fitted together. As shown in FIG. 1, the brake releasing plate 4 includes a main body 4a and three legs 4b that can pass through the through-holes 21a of the hub 11, and by passing the respective legs 4b through the through-holes 21a, as shown in FIG. 2 the brake releasing plate 4 is disposed on the base plate 21 inside the hub 11 so as to be capable of up-down movement. As shown in FIG. 1, the teeth 5a that can mesh with the brake teeth 22 of the hub 11 are formed on the base surface of the locking member 5. The brake spring 6 is disposed between the upper case 51 and the locking member 5 and energizes the locking member 5 toward the base plate 21 of the hub 11 of the tape reel 2.

Next, the operation of the information recording medium 1 during recording and reproducing will be described with reference to the drawings.

When the information recording medium 1 is ejected from a drive apparatus, not shown, that is, when the information recording medium 1 is not in use, as shown in FIG. 2, the locking member 5 is energized by the brake spring 6 and is moved toward the base plate 21 of the hub 11 while pressing the brake releasing plate 4. In this state, the teeth 5a of the locking member 5 mesh with the brake teeth 22 of the hub 11 and lock the tape reel 2 in a non-rotatable state.

Figure 5:
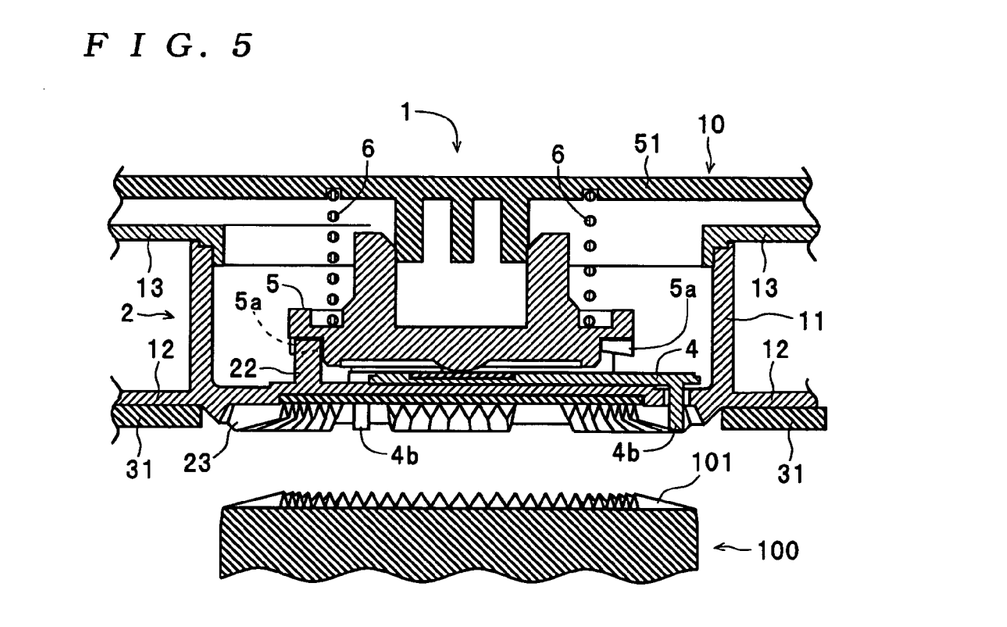
FIG. 5 is a cross-sectional view of the information recording medium and a drive shaft of a drive apparatus.
Figure 6:
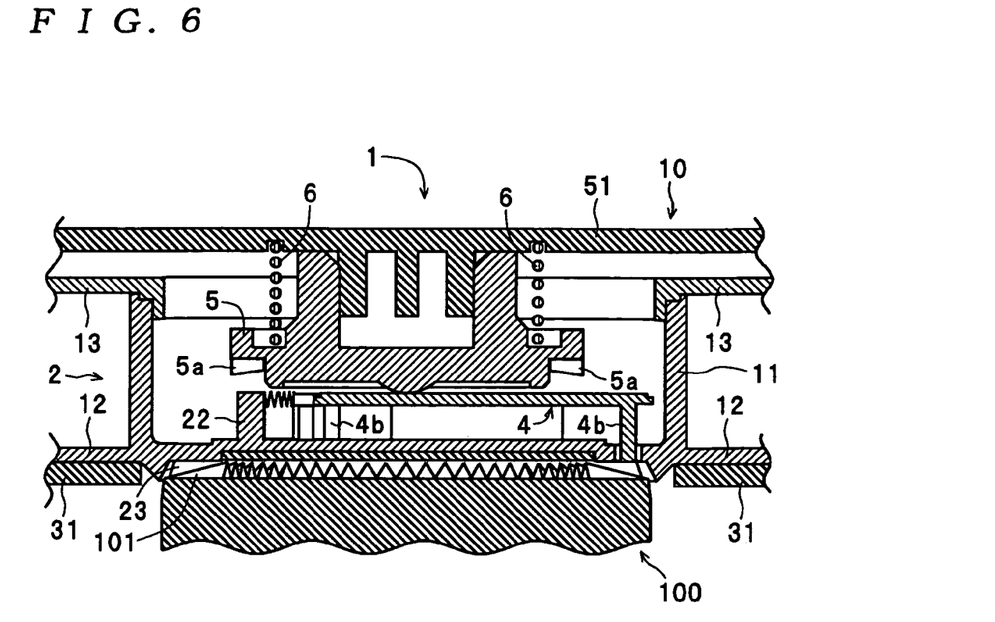
FIG. 6 is a cross-sectional view of the information recording medium and the drive shaft in a state where driving teeth and driven teeth mesh.

On the other hand, when the information recording medium 1 is loaded into a loading unit of a drive apparatus, as shown in FIG. 5, the loading unit moves the information recording medium 1 toward the driving teeth 101 of the drive shaft 100 inside the drive apparatus. Next, the legs 4b of the brake releasing plate 4 are pressed by the drive shaft 100 to release the engagement of the teeth 5a of the locking member 5 and the brake teeth 22 of the hub 11. Also, the chucking plate 14 of the tape reel 2 is pulled by magnetic attraction by a magnetic attraction portion, not shown, attached to a front end of the drive shaft 100, so that as shown in FIG. 6, the driving teeth 101 disposed on the front end of the drive shaft 100 mesh with the driven teeth 23 of the hub 11.

In this case, the teeth that compose the driven teeth 23 are formed slightly smaller than the teeth that compose the driving teeth 101. Also, the contact surfaces 24a are formed at positions separated from the reference plane 23a of the driven teeth 23 toward the base plate 21 by the length L1 between the reference plane 101a of the driving teeth 101 and the front end surfaces 101b of the driving teeth 101. This means that in a stopped state (non-driven state), as shown in FIG. 8, the front end surfaces 101b of the driving teeth 101 contact the three contact surfaces 24a and the tooth surfaces 23c of the driven teeth 23 are slightly separated from the tooth surfaces 101c of the driving teeth 101. Accordingly, even if there is a difference between the actual dimensions of the driven teeth 23 and the designed dimensions, a state where the tooth surfaces 23c and 101c are in contact at certain positions and apart at other positions is reliably avoided and the driving teeth 101 and the driven teeth 23 mesh in a state where the front end surfaces 101b and the contact surfaces 24a, that is, the driving teeth 101 and the base plate 21 of the hub 11 are parallel or substantially parallel.

Next, the drive apparatus pulls the magnetic tape T wound around the tape reel 2 out of the case body 3 from a tape withdrawal opening. Next, the magnetic tape T is wound onto a tape reel of the drive apparatus and the drive shaft 100 of the drive apparatus rotates in the direction of the arrow A (a feeding out direction for the magnetic tape T) shown in FIG. 9 at a rotational speed corresponding to the withdrawal speed of the magnetic tape T. At this time, as shown in FIG. 9, while the contact between the front end surfaces 101b of the driving teeth 101 and the contact surfaces 24a is maintained, the tooth surfaces 101c on front sides in the direction of rotation (i.e., the right sides in FIG. 9) of the teeth composing the driving teeth 101 contact the tooth surfaces 23c on rear sides in the direction of rotation (i.e., the left sides in FIG. 9) of the teeth composing the driven teeth 23, and the tooth surfaces 23c are pressed by the tooth surfaces 101c resulting in the tape reel 2 being rotated in the direction of the arrow A. Here, even in this state, the front end surfaces 101b of the driving teeth 101 contact the three contact surfaces 24a and the driving teeth 101 and the driven teeth 23 mesh in a state where the driving teeth 101 and the base plate 21 of the hub 11 are parallel or substantially parallel. Accordingly, the tape reel 2 can be smoothly rotated without surging, and therefore damage to the magnetic tape T is reliably prevented.

Next, the drive apparatus records data on the magnetic tape T and/or reads data from the magnetic tape T. When the recording and reading of data is complete, the drive shaft 100 is rotated in the direction of the arrow B (a rewinding direction of the magnetic tape T) shown in FIG. 10. At this time, as shown in FIG. 10, while the contact between the front end surfaces 101b of the driving teeth 101 and the contact surfaces 24a is maintained, the tooth surfaces 101c on front sides in the direction of rotation (i.e., the left sides in FIG. 10) of the teeth composing the driving teeth 101 contact the tooth surfaces 23c on rear sides in the direction of rotation (i.e., the right sides in FIG. 10) of the teeth composing the driven teeth 23, and the tooth surfaces 23c are pressed by the tooth surfaces 101c, resulting in the driven teeth 23 being rotated in the direction of the arrow B. Here, since the front end surfaces 101b of the driving teeth 101 contact the contact surfaces 24a, in the same way as when the tape reel 2 rotates in the direction of the arrow A described above, the tape reel 2 can be smoothly rotated without surging. By doing so, the magnetic tape T is rewound onto the tape reel 2.

Next, when the rewinding of the magnetic tape T is completed, the loading unit of the drive apparatus separates the information recording medium 1 from the drive shaft 100. At this time, the engagement of the driving teeth 101 of the drive shaft 100 and the driven teeth 23 of the tape reel 2 is released. Also, the locking member 5 energized by the brake spring 6 moves toward the base plate 21 of the hub 11 to cause the teeth 5a of the locking member 5 to mesh with the brake teeth 22 of the hub 11 and thereby lock the tape reel 2 in the non-rotatable state.

In this way, according to the tape reel 2, the cartridge case 10, and the information recording medium 1, by forming, on the outer surface of the base plate 21, the contact surfaces 24a that can be contacted by the front end surfaces 101b of the driving teeth 101 when the driving teeth 101 and the driven teeth 23 mesh, even if there is a difference between the actual dimensions of the driven teeth 23 and the designed dimensions, it is possible to avoid a state where the driven teeth 23 and the driving teeth 101 are in contact at certain positions and apart at other positions when the driven teeth 23 and the driving teeth 101 mesh, and therefore it is possible to cause the driving teeth 101 and the driven teeth 23 to mesh in a state where the front end surfaces 101b and the contact surfaces 24a, that is, the driving teeth 101 and the base plate 21 of the hub 11, are parallel or substantially parallel. Accordingly, since the tape reel 2 can be smoothly rotated without surging, it is possible to reliably prevent damage and the like to the magnetic tape T.

Also, when the parallelism of the lower flange 12 and the upper flange 13 is measured using a measuring jig, for example, it is possible to have front end surfaces of the teeth of the measuring jig contact the contact surfaces 24a when the measuring jig and the driven teeth 23 mesh, and even if there is a difference between the actual dimensions of the driven teeth 23 and the designed dimensions, it is possible to carry out the measurements in a state where the reference plane 23a of the driven teeth 23 is parallel or substantially parallel to the measuring reference surface of the measuring jig. This means that according to the tape reel 2, the cartridge case 10, and the information recording medium 1, it is possible to correctly measure the parallelism of the lower flange 12 and the upper flange 13.

Also, according to the tape reel 2, the cartridge case 10, and the information recording medium 1, by constructing the driven teeth 23 so that the tooth surfaces 23c and 101c of the driven teeth 23 and the driving teeth 101 are separated from one another in the non-driven state and the tooth surfaces 23c and 101c contact one another in the driven state, the tape reel 2 can be reliably rotated in a state where the front end surfaces 101b of the driving teeth 101 contact the contact surfaces 24a.

Also, according to the tape reel 2, the cartridge case 10, and the information recording medium 1, by forming the contact surfaces 24a at positions separated from the reference plane 23a of the driven teeth 23 toward the base plate 21 of the hub 11 by a length between the reference plane 101a and the front end surfaces 101b of the driving teeth 101, it is possible to have the driven teeth 23 mesh with the driving teeth 101 in a state where the front end surfaces 101b of the driving teeth 101 contact the contact surfaces 24a and the reference planes 23a, 101a coincide. Accordingly, it is possible to keep the clearance between the tooth surfaces 23c and 101c of the driven teeth 23 and the driving teeth 101 uniform or substantially uniform in the non-driven state and to keep the contact between the tooth surfaces 23c and 101c uniform or substantially uniform in the driven state, resulting in it being possible to reliably prevent rattling of the tape reel 2 at the start of driving and at the end of driving.

In addition, according to the tape reel 2, the cartridge case 10, and the information recording medium 1, by forming the contact surfaces 24a on the three contact portions 24 disposed on the outer surface of the base plate 21 at equal intervals on a circle about the axis S of the hub 11, it is possible to support the tape reel 2 with the front end surfaces 101b of the driving teeth 101 that contact the contact surfaces 24a, and therefore it is possible to stably keep the driving teeth 101 and the base plate 21 of the hub 11 in a parallel or substantially parallel state.

Note that the present invention is not limited to the above construction. For example, although an example where three contact portions 24 are formed on the outer surface of the base plate 21 has been described, the number of contact portions 24, and therefore the number of the contact surfaces 24a is not limited to three, and can be set at any arbitrary number. Also, although an example where the driven teeth 23 are constructed so that the tooth surfaces 23c of the driven teeth 23 and the tooth surfaces 101c of the driving teeth 101 are separated in the non-driven state has been described, it is possible to use a tape reel 2 where the driven teeth 23 are constructed so that the tooth surfaces 23c, 101c contact each other in the non-driven state also. Also, although a single reel-type information recording medium 1 has been described as an example, the information recording medium according to the present invention includes various types of information recording media including a tape reel with driven teeth that mesh driving teeth of a drive apparatus.

What is claimed is:

1. A tape reel comprising:
   a generally cylindrical-shaped hub provided on an upper surface of a base plate, driven teeth provided on a lower surface of the base plate, the driven teeth being configured to mesh with opposing driving teeth of a drive apparatus so as to rotate the tape reel; and
   a contact surface provided on the lower surface of the base plate and configured to contact front end surfaces of the driving teeth when the driving teeth and the driven teeth mesh.

2. The tape reel according to claim 1, wherein tooth surfaces of the driven teeth and the driving teeth are spaced from one another when the tape reel is not driven and the tooth surfaces contact one another when the tape reel is driven.

3. The tape reel according to claim 1, wherein the contact surface is formed at a position spaced from a reference plane which passes through an intermediate portion of the driven teeth, the contact surface being spaced toward the base plate by a length which extends from the reference plane to the front end surfaces of the driving teeth.

4. The tape reel according to claim 1, wherein the contact surface is formed on each of three contact portions provided on the lower surface of the base plate, the contact portions being spaced at equal intervals on a circle which surrounds a central axis of the hub.

5. A cartridge case comprising:
   a tape reel including a generally cylindrical-shaped hub provided on an upper surface of a base plate, driven teeth provided on a lower surface of the base plate, the driven teeth being configured to mesh with opposing driving teeth of a drive apparatus so as to rotate the tape reel;
   a case body that rotatably houses the tape; and
   a contact surface provided on the lower surface of the base plate and configured to contact front end surfaces of the driving teeth when the driving teeth and the driven teeth mesh.

6. An information recording medium comprising:
   a cartridge case having a tape reel, which includes a generally cylindrical-shaped hub provided on an upper surface of a base plate, driven teeth provided on a lower surface of the base plate, the driven teeth being configured to mesh with opposing driving teeth of a drive apparatus so as to rotate the tape reel;
   a case body that rotatably houses the tape reel;
   a magnetic tape wound around the tape reel; and
   a contact surface provided on the lower surface of the base plate and configured to contact front end surfaces of the driving teeth when the driving teeth and the driven teeth mesh.

* * * * *

UNITED STATES PATENT AND TRADEMARK OFFICE
CERTIFICATE OF CORRECTION

PATENT NO. : 7,334,751 B2
APPLICATION NO. : 11/362258
DATED : February 26, 2008
INVENTOR(S) : H. Suzuki It is certified that error appears in the above-identified patent and that said Letters Patent is hereby corrected as shown below:

At column 10, line 8 (claim 5, line 8) of the printed patent, after "tape" insert --reel--.

Signed and Sealed this

Nineteenth Day of August, 2008

JON W. DUDAS
*Director of the United States Patent and Trademark Office*